3,320,265
6-PHENYL-1,2,3,4,5,6-HEXAHYDRO-2,6-METHANO-3-BENZAZOCINES
Frank H. Clarke, Jr., Armonk, N.Y., assignor to Geigy Chemical Corporation, Ardsley, N.Y., a corporation of Delaware
No Drawing. Continuation of abandoned application Ser. No. 322,063, Nov. 7, 1963. This application Nov. 10, 1966, Ser. No. 593,326
19 Claims. (Cl. 260—294.7)

This application is a continuation of pending application, Ser. No. 322,063, filed Nov. 7, 1963, now abandoned.

This invention relates to novel organic compounds, to novel methods for their preparation, to novel methods for the use of such compounds and to novel intermediates employed in their preparation. In particular, the present invention is directed to 1,2,3,4,5,6-hexahydro-6-phenyl-2,6-methano-3-benzazocines or 5-phenyl-6,7-benzomorphans, a new class of compounds possessing unexpected and useful pharmacological properties.

The compounds embraced by the present invention may be represented by the following formula:

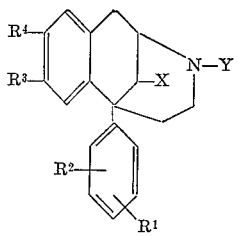

in which each of $R^1$ and $R^2$ is hydrogen, halogen, (lower) alkyl, (loweralkoxy), lower alkanoyloxy, hydroxy or trifluoromethyl;
each of $R^3$ and $R^4$ is hydrogen, hydroxy, (lower)alkoxy, or (lower)alkanoyloxy;
X is hydrogen or (lower)alkyl, and
Y is hydrogen, (lower)alkyl, (lower)alkenyl, (lower) alkynyl, substituted (lower)alkyl or substituted (lower) alkenyl.

By the term "(lower)alkyl" and derivations thereof such as "(lower)alkoxy," "(lower)alkanoyloxy," "(lower)alkenyl" and the like is intended a group comprising a branched or straight hydrocarbon chain containing from one to six carbon atoms. Representative of (lower)alkyl groups are thus methyl, ethyl, propyl, i-propyl, butyl, s-butyl, t-butyl, pentyl, isopentyl, hexyl and the like. Embraced by lower alkoxy are groups containing from one to six carbon atoms and joined through an oxygen ether bond such as methoxy, ethoxy, i-propoxy, butoxy and the like. It is to be understood that when the nature of any particular functional group in these moities, such as an olefinic bond in an alkenyl group, requires two carbon atoms, the hydrocarbon portion of the moiety will have from two to seven carbon atoms. Thus "(lower) alkanoyloxy" is typified by acetoxy, propanoyloxy, butanoyloxy, pentanoyloxy, hexanoyloxy and the like, while representatives of the term "(lower)alkenyl" includes vinyl, allyl, 2-methyl-2-butenyl, isopropenyl, 1,3-butadienyl, 2-pentenyl and the like.

With greater particularity to Formula I, the phenyl group in the 5 position of the fundamental benzomorphan may be unsubstituted, e.g., $R^1$ and $R^2$ are both hydrogen; monosubstituted, e.g., one of $R^1$ and $R^2$ is hyhrogen and the other is a group other than hydrogen; or disubstituted, e.g., both $R^1$ and $R^2$ are groups other than hydrogen. $R^1$ and $R^2$ may be but are not necessarily the same.

Similarly the groups designated by $R^3$ and $R^4$ in the benzo moiety of the fundamental benzomorphan nucleus may be the same or different groups. While both may be hydrogen, the preferred embodiment is characterized by $R^3$ being hydroxy or a derivative thereof, e.g., alkoxy or alkanoyloxy, and $R^4$ being hydrogen. Other combinations however, falling within the scope of Formula I are also contemplated.

X may be hydrogen or (lower)alkyl, preferably methyl, although any alkyl group of from one to six carbon atoms as described above is embraced.

The group Y may be hydrogen or a substituent of an essentially hydrocarbon nature. For example, Y may be (lower)alkyl; (lower)alkenyl, such as vinyl, allyl, 2-propeny, 2-isopentenyl and the like; or (lower)alkynyl, such as ethynyl, propynyl and the like. In addition, Y may be a substituted (lower)alkyl group in which one hydrogen atom of the alkyl group is replaced by a substituent such as cycloalkyl of from three to six carbon atoms, as for example, cyclopropyl; phenyl including substituted phenyl such as chlorophenyl, iodophenyl, bromophenyl, nitrophenyl, aminophenyl, (lower)alkoxyphenyl and the like; amino including mono and dialkylamino and cycloalkylamino groups; hydroxy, (lower)alkoxy or (lower) alkanoyloxy. Examples of these substituted (lower)alkyl groups are thus cyclopropylmethyl, phenylethyl, 3,4-dichlorobenzyl, 4-aminophenylethyl, methylaminopropyl, 2-piperidinylethyl, 2-ethoxyethyl, 2-hydroxyethyl, 2-acetoxyethyl and the like. Also encompassed within the scope of Y are substituted (lower)alkenyl such as halo(lower) alkenyl, e.g., 3-chloroallyl. Thus Y may be defined as being hydrogen, alkenyl, halo(lower)alkenyl, (lower)alkynyl or Z-alkylene wherein Z is hydrogen, cycloalkyl, phenyl, halophenyl, nitrophenyl, aminophenyl, (lower)-alkoxyphenyl, amino, alkylamino, dialkylamino, (lower)-alkoxy or (lower)alkanoyloxy.

A particularly valuable class of compounds is represented by Formula I when X is hydrogen, $R^1$ is as defined above, $R^2$ is hydrogen, $R^3$ is hydroxy, $R^4$ is hydrogen and Y is as defined above.

The compounds of this invention are non-toxic analgesics having an activity of the same order of magnitude as morphine.

These compounds may be administered parenterally or orally in any of the usual pharmaceutical forms including tablets, capsules, powders, suspensions, solutions, syrups and the like. Particularly valuable formulations include sustained release preparations which may be compounded by any of the known procedures.

Since the compounds of the instant invention possess an amino group, various obvious derivatives may be made without departing from the spirit of the present invention. For example, various quaternary salts such as the methiodide may be prepared. So too, the N-oxides of the instant compounds demonstrate important properties.

A particularly valuable embodiment of the present invention includes the acid addition salts prepared from pharmaceutically acceptable non-toxic acids. Such pharmaceutically acceptable non-toxic acid addition salts include those derived from organic and inorganic acids such as, without limitation, hydrochloric, hydrobromic, sulfuric, phosphoric, methanesulfonic, acetic, lactic, succinic, malic, aconitic, phthalic, tartaric, and like acids.

The compounds of this invention are prepared by cyclization of a compound of the formula:

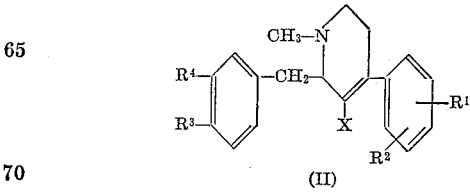

(II)

with a strong mineral acid such as hydrobromic acid or phosphoric acid. In Formula II it is to be noted that while R¹, R², R³ and R⁴ are as defined as above, in certain instances side reactions may occur. Thus when any of R¹, R², R³ and R⁴ is alkoxy or alkanoyloxy and hydrobromic acid is employed, hydrolysis will most often occur during the cyclization so as to convert such a group to hydroxy. Similarly alkanoyloxy groups will be converted to a hydroxy group when phosphoric acid is employed in the cyclization step. Such a hydroxy group may however be re-etherified or re-esterified as the case may be subsequent to the cyclization if an alkoxy or alkanoyloxy group respectively is desired. Since however, the presence of hydroxy groups may result in the undesired precipitation of phenolic salts in preceding steps, it is generally preferable when a hydroxy group is desired to take advantage of this hydrolysis of alkoxy groups which occurs in the cyclization step and thus employ the corresponding alkoxy compound in preceding reactions.

While Formula II exhibits a methyl group attached to the nitrogen of the tetrahydropyridine ring, other inert groups embraced by the definition of Y may alternatively be employed. For example, in place of the methyl group in Formula II there may be another (lower)alkyl group or a phenyl(lower)alkyl group such as benzyl. When such a group on the nitrogen atom is the same as the Y group in the desired final compound of Formula I, no further reactions are necessary after cyclization. If a different Y group such as alkenyl, alkynyl, alkoxyalkyl or the like is desired, the employment of additional steps is preferred for the maximization of yield and purity. In such instances, the cyclization is preferably effected with an N-methyl compound (such as shown by Formula II) or other N-alkyl compounds in view of the protection afforded by such groups and their ease of removal subsequent to formation. Thus a benzomorphan of Formula I wherein Y is methyl (Formula III) can be converted by one of several routes to benzomorphan derivatives where Y is some other group. For example, the conversion of benzomorphans of Formula III to the corresponding N-desmethyl compound is accomplished by treatment with a slight molar excess of cyanogen bromide to form the corresponding cyanobenzomorphan (IV) which upon reduction with lithium aluminum hydride yields the desired N-desmethyl compound V.

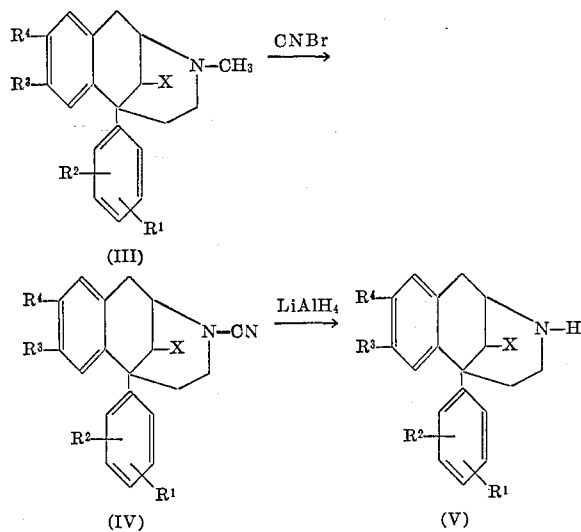

Alternatively, in some instances, N-substituted derivatives may be directly prepared from the N-methyl compound of Formula III. Thus by treatment with β-phenylethyliodide there is formed a quaternary salt which upon treatment with lithium aluminum hydride yields the corresponding N-(β-phenylethyl) compound.

Compound V above is a particularly valuable compound since by application of various procedures, it is possible to introduce a wide variety of substituents onto the nitrogen atom of the benzomorphan nucleus. For example, treatment of a compound of Formula V with an alkenyl chloride or alkynyl chloride yields the corresponding compound of Formula I wherein Y is alkenyl or alkynyl respectively. Where an alkyl or phenylalkyl group is desired and use of the corresponding alkyl halide or phenylalkyl halide may give rise to a quaternary salt, the group is preferably introduced through use of an acyl reagent with subsequent reduction of the amide thus formed. For example, treatment of a compound of Formula V with p-chlorophenylacetyl chloride to produce the N-(p-chlorophenylacetyl) compound followed by reduction yields a benzomorphan of Formula I wherein Y is β-(p-chlorophenyl)ethyl. So too, by acylation of the N-desmethyl compound with cyclopropane carboxylic acid chloride and subsequent reduction of the resultant cyclopropyl amide, there is obtained a compound of Formula I wherein Y is cyclopropylmethyl.

Notwithstanding the availability of the above synthetic routes for introducing various Y groups, it is possible through the careful selection of conditions to directly cyclize compounds of the formula:

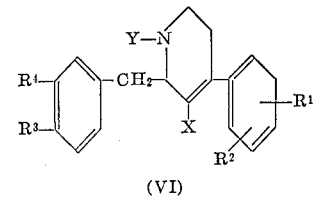

(VI)

wherein X, Y, R¹, R², R³ and R⁴ are as above defined.

Surprisingly not only are the compounds of Formula VI valuable intermediates for the preparation of the benzomorphan compounds of this invention, they are themselves useful analgetic agents demonstrating highly valuable properties.

The 5-phenylbenzomorphans of this invention can alternatively be prepared by cyclization of compounds of Formula II or Formula VI by use of a Lewis acid such as aluminum bromide, aluminum chloride and the like. This method of cyclization offers advantages in certain instances, particularly when the production of one isomer is desired over production of the other. In addition, the use of aluminum bromide or aluminum chloride with the hydrochloride salt of a tetrahydropyridine of Formula II or Formula VI permits maintenance of any alkoxy group constituting any of R¹–R⁴. The use of the hydrobromide salt, on the other hand, of the same tetrahydropyridine derivative in the cyclization with aluminum chloride or aluminum bromide results in cleavage of any such alkoxy groups to hydroxy groups as discussed above.

The requisite starting materials of Formula VI may be prepared by treatment of a substituted tetrahydropyridine of Formula VII with a benzyl halide, preferably a benzyl chloride, of Formula VIII to give the quaternary salt of Formula IX. Upon treatment with strong base, such as sodium hydroxide or potassium hydroxide, this rearranges to yield a compound of Formula VI.

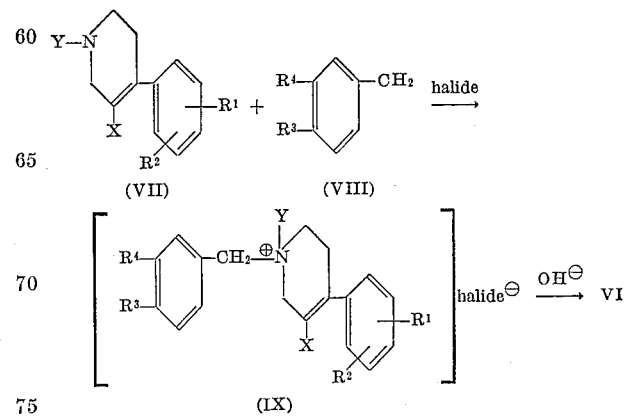

In this and the following synthetic route R¹, R², R³ and R⁴ may be any of the specified groups but preferably not hydroxy. When a hydroxy group is desired in the final compound of Formula I, it is advantageous to utilize the corresponding alkoxy derivative as described above. So too, it is desirable to employ compounds in which Y is alkyl or phenylalkyl. The use of other groups such as alkynyl or alkenyl generally is not advantageous in terms of purity and yield in these intermediate reactions. In addition when Y is a group other than alkyl or phenylalkyl, there may be introduced the requirement for additional conversions since the subsequent cyclization is preferably executed with compounds in which Y is alkyl or phenylalkyl.

The above rearrangement from Formula IX to Formula VI employs a novel process which has applicability beyond the preparation of intermediates for the compounds of the present invention. This process is thus also of use in preparing the corresponding desphenyl intermediates for 2'-hydroxy-5,9-dimethyl-2-phenylethyl-6,7-benzomorphan (phenazocine) and 2'-hydroxy-5,9-dimethyl-2-dimethylallyl-6,7-benzomorphan. The process involves the use of an alkali metal hydroxide, such as sodium or potassium hydroxide in an inert organic solvent such as benzene, a dialkylether, (lower)alkyl ketone or the like. The quaternary salt, which is substantially insoluble in the organic solvent, rearranges upon heating in alkali to the corresponding 2-benzyl substituted 1,2,5,6-tetrahydropyridine, which is soluble in the solvent, while the alkali metal salt of the quaternary salt anion thus formed precipitates and may be removed by filtration. The desired intermediate may be isolated by formation of an acid addition salt such as the hydrochloride with addition of ether if necessary to effect precipitation. This process possesses important advantages in terms of efficiency and economy over any previous process so employed.

Th ecompounds of Formula VI may be alternatively prepared by treatment of the pyridinium compound of Formula X with a Grignard reagent such as shown by Formula XI. The resultant dihydropyridine compound of Formula XII is then selectively hydrogenated as by the use of sodium borohydride to yield the desired intermediate.

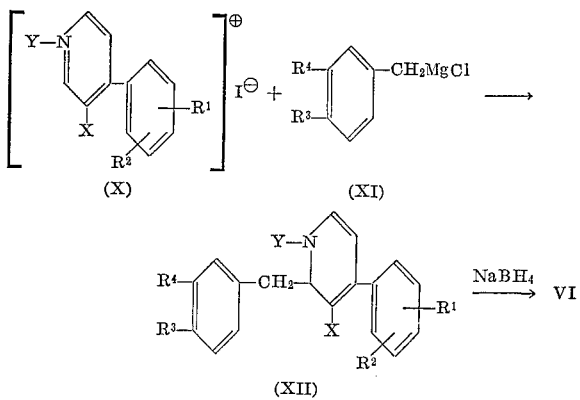

Compounds of Formula VII may be prepared by treatment of a piperidone of Formula XIII with a phenyl lithium compound (XIV) or a phenyl magnesium halide (XV). The resultant product XVI in either case is dehydrated by standard methods to yield the requisite intermediate.

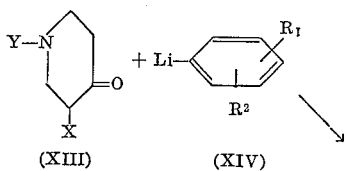

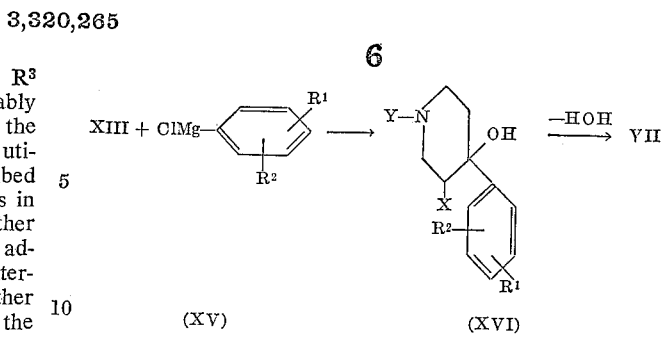

Alternatively when X is hydrogen, an isopropylbenzene of Formula XVII may be condensed with an amine and formaldehyde to yield XVI which is dehydrated as in the above case.

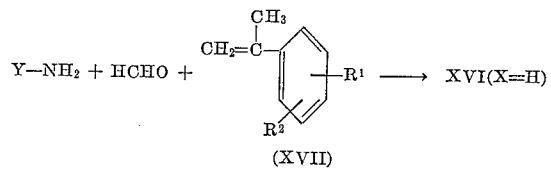

Compounds of Formula X may be prepared by dehydrogenation of compounds of Formula VII, as with palladium-on-charcoal, followed by formation of the quaternary salt.

As can be seen from Formula I, the compounds of the present invention may exist in at least two optical isomers. Thus the presence of an "asymmetric" carbon atom in the morphan ring will result in the existence of d- and l- optical isomers. In addition, when X in Formula I is alkyl, stereoisomers are possible, the alkyl group being cis or trans to the phenyl group in position 5. Still further isomeric forms will exist if the group represented by Y lacks a plane of symmetry. In each of these instances however, the geometric or stereoisomers may be separated by taking advantage of differences in their properties, e.g., by fractional crystallization or distillation. When it is desirable to resolve enantiomorphs, the standard formation of diastereoisomeric salts by the use of an optically active acid is employed. All such isomeric forms are within the purview of the present invention (including the d- and l- forms of each of the α and β isomers when X is alkyl).

The following examples, presented for purposes of illustration and not limitation, will further serve to typify the nature of this invention.

EXAMPLE 1

2'-hydroxy-2-methyl-5-phenyl-6,7-benzomorphan (a) 1-methyl-4-phenyl-1,2,5,6-tetrahydropyridine.—An ethereal solution of 76.5 g. (0.675 mole) of redistilled 1-methyl-4-piperidone is added with stirring over 45 min. to an ice-cooled benzene-ethereal solution containing 0.74 mole of phenyl lithium. The reaction mixture is maintained below 10° during addition and then allowed to attain room temperature with stirring continued for two hours after addition is complete. At the end of this time, the mixture is poured into 500 ml. of ice water with stirring. Chloroform is added and the mixture heated gently until all solid is dissolved. The organic layer is separated, dried over sodium sulfate and evaporated to an oil. While this oil may be allowed to solidify to yield 1-methyl-4-phenyl-4-hydroxypiperidine, M.P. 107–110° C. after trituration with pentane, it may be employed directly in the next step without further purification. Thus the oil is dissolved in 215 ml. of conc. hydrochloric acid and this acidic solution heated at reflux temperature for two hours with stirring to prevent superheating. At the end of this time, the solution is cooled and poured into an ice cold aqueous solution of 170 g. of sodium hydroxide. This reaction mixture is then extracted with chloroform and the extracts dried over sodium sulfate. After removing the solvents by evaporation, the oil which is obtained is distilled in vacuo to yield the intermediate product 1-methyl-4-phenyl-1,2,5,6-tetrahydropyridine, B.P. 103–114° C./0.9 mm.

Alternatively this product may be obtained by use of phenyl magnesium bromide in place of phenyl lithium.

(b) *1-methyl-1-(4-methoxybenzyl)-4-phenyl-1,2,5,6-tetrahydropyridinium chloride.*—Ninety grams (.58 mole) of p-methoxybenzyl chloride in 50 ml. of acetone are added in a dropwise fashion to a stirred solution of 78 g. (.45 mole) of 1-methyl-4-phenyl-1,2,5,6-tetrahydropyridine in 350 ml. of acetone at reflux. The mixture is heated at reflux with stirring for two hours, at the end of which time the solid which has formed is collected from the cooled solution. This solid is washed with acetone and thoroughly dried in vacuo to yield the quaternary salt with apparently variable melting points, e.g., 119–126°, 123–126° and 167–170° C. for three separate preparations. All such material however can be employed in the following procedure without adverse effect on yield or purity.

The requisite p-methoxybenzylchloride is obtained by treating a benzene solution of anisyl alcohol with anhydrous hydrogen chloride with cooling until the solution is saturated. After stirring for two hours, the aqueous layer is removed and the organic layer stirred for one hour with anhydrous sodium sulfate. The drying agent is then removed by filtration and the solvent and hydrogen chloride are removed by flash evaporation. The product can be used in the above procedure without further purification.

(c) *1-methyl-2-(4-methoxybenzyl)-4-phenyl-1,2,5,6-tetrahydropyridine.*—An ethereal suspension of 165 g. (1.05 mole) of the quaternary salt obtained in part (b) of this example is treated under nitrogen with 625 ml. (.98 mole) of a 1.56 N ethereal solution of butyl lithium. The butyl lithium is added slowly over a period of one hour, the reaction of mixture being stirred during the addition. At the end of this time, the reaction mixture is refluxed for two hours, cooled and poured into one liter of cold water. The ethereal layer is separated and extracted with a solution of 100 ml. of conc. hydrochloric acid in one liter of water. The aqueous extracts together with the oily precipitate are then rendered alkaline by the addition of 200 ml. of conc. aqueous ammonia. The precipitated base is taken up in ether and the solution thus obtained dried over sodium sulfate. The drying agent is removed by filtration and the solvent by evaporation to yield 1-methyl-2-(4-methoxybenzyl)-4-phenyl-1,2,5,6-tetrahydropyridine which is further purified by distillation at 135–225° C./2 mm.

The distillate is converted to the hydrobromide by the cautious addition of anhydrous hydrogen bromide to a cold acetone solution of the base. Collection of the solid thus formed and recrystallization yields the hydrobromide salt, M.P. 170–172° C.

In a similar fashion the hydrochloride salt is obtained by employing anhydrous hydrogen chloride in place of hydrogen bromide. This salt has a melting point of 119–124° C.

Alternatively 1-methyl-2-(4-methoxyphenyl)-4-phenyl-1,2,5,6-tetrahydropyridine is obtained in the following manner. A mixture of 33 g. of the quaternary salt obtained in part (b) of this example and 6.0 g. of powdered potassium hydroxide is stirred at reflux with 300 ml. of benzene for two hours. The solids are then removed by filtration and the filtrate is acidified with an ethereal solution of anhydrous hydrogen bromide. The hydrobromide salt thus obtained is recrystallized from ethanol-ether to give colorless crystals, melting point as above.

Alternatively acetone may be used in place of benzene in the above example. After thirty minutes of stirring at reflux, the solution is acidified with anhydrous hydrogen chloride, filtered to remove inorganic compounds, and evaporated to dryness in vacuo. The residue is triturated with ether to remove polymers of acetone and again evaporated to dryness. The residue may be cyclized directly using 48% hydrobromic acid as described in part (d) of this example below.

(d) *2′-hydroxy-2-methyl-5-phenyl-6,7-benzomorphan.*—A solution of 32.7 g. of 1-methyl-2-(4-methoxybenzyl)-4-phenyl-1,2,5,6-tetrahydropyridine hydrobromide in 330 ml. of 48% hydrobromic acid is refluxed for four and one-half hours. At the end of this time, the reaction mixture is cooled and poured into a cold solution of 330 ml. of conc. aqueous ammonia and an equal volume of ice. The solid which forms is collected by filtration and dried to constant weight to yield 2′-hydroxy-2-methyl-5-phenyl-6,7-benzomorphan, M.P. 212–220° C. Recrystallization of this material from methanol raises the melting point to 249–252° C.

Calc. for $C_{19}H_{21}NO$ (279.39): C, 81.68; H, 7.58; N, 5.01. Found: C, 81.43; H, 7.69; N, 4.71.

The reflux period in this procedure may be increased to as much as 24 hours without appreciable effect on the yield.

The above free base is converted to the hydrochloride salt by treating an absolute methanol solution of the base with anhydrous hydrogen chloride. The solid which forms upon addition of 4 volumes of anhydrous ether is further recrystallized from methanol-ether, M.P. 294–296° C.

Calc. for $C_{19}H_{21}NO \cdot HCl$ (315.83): C, 72.25; H, 7.02; Cl, 11.23. Found: C, 72.17; H, 7.26; Cl, 11.26.

EXAMPLE 2

*2′-hydroxy-2-methyl-5-(p-chlorophenyl)-6,7-benzomorphan*

(a) *1-methyl - 4-(p-chlorophenyl) - 1,2,5,6-tetrahydropyridine.*—A mixture of 3.00 g. of 4-(p-chlorophenyl)-1,2,5,6-tetrahydropyridine hydrochloride, 2.36 g. sodium acetate, 7.9 ml. of 37% formaldehyde solution and 3.62 g. of 91% formic acid is heated at steam bath temperature for two hours with stirring. The mixture is then cooled and poured into 50 ml. of an ice-water mixture. After rendering the solution strongly alkaline by the addition of concentrated aqueous ammonia, it is extracted with ethyl ether. The extracts are then washed with water and dried over sodium sulfate. Upon evaporation of the solvent, there is obtained 1-methyl-4-(p-chlorophenyl)-1,2,5,6-tetrahydropyridine, M.P. 90–91° C., which may be further purified by recrystallization from either isopropyl ether or petroleum ether.

(b) *1-methyl - 1-(p-methoxybenzyl) - 4-(p-chlorophenyl)-1,2,5,6-tetrahydropridinium chloride.*—To a solution of 9.66 g. of 1-methyl-4-(p-chlorophenyl)-1,2,5,6-tetrahydropyridine in 30 ml. of acetone is added 9.12 g. of p-methoxybenzyl chloride dissolved in 10 ml. of acetone. The solution is stirred at reflux for one-half an hour, cooled and filtered. The quaternary salt thus obtained demonstrates a melting point of 194–195.5° C.

(c) *1-methyl - 2-(p-methoxybenzyl) - 4-(p-chlorophenyl)-1,2,5,6-tetrahydropyridine hydrobromide.*—To 3.30 g. of freshly dried (80°/.1 mm.) 1-methyl-1-(p-methoxybenzyl) - 4-(p-chlorophenyl) - 1,2,5,6-tetrahydropyridinium chloride slurried in 50 ml. anhydrous ether are added 5.50 ml. of 2.00 N phenyl lithium under dry nitrogen free of oxygen. The mixture is refluxed for two hours under nitrogen. The cooled mixture is then poured into 50 g. of ice-water and the resultant ether phase extracted three times with 50 ml. portions of 2 N hydrochloric acid. The oily hydrochloride phase so obtained is rendered basic by addition of concentrated aqueous ammonia and extracted with ethyl ether. The ethereal extracts are washed once with water, dried over magnesium sulfate with clarification and evaporated. The oil thus obtained is dissolved in acetone and treated with hydrogen bromide gas until acid to Congo red indicator. An equal volume of ether is added and the solution cooled. The solid thus formed is collected by filtration to yield 1-methyl - 2-(p-methoxybenzyl) - 4 - (p-chlorophenyl)-1,2,5,6 - tetrahydropyridine hydrobromide, M.P. 172–

178° C. Upon further recrystallizations from 1:1:3 ethanol:acetone:ether, the material demonstrates a melting point of 181–182° C.

Calc. for $C_{20}H_{22}ClNO \cdot HBr$: C, 58.76; H, 5.67; Br, 19.55. Found: C, 58.81; H, 5.62; Br, 19.41, 19.68.

(d) *2'-hydroxy-2-methyl - 5-(p-chlorophenyl)-6,7-benzomorphan.*—A mixture of 8.72 g. of 1-methyl-2-(p-methoxybenzyl) - 4-(p-chlorophenyl) - 1,2,5,6-tetrahydropyridine hydrobromide and 131 ml. of 48% hydrobromic acid is refluxed for 19 hours with rapid stirring. The hot solution is cautiously poured into a mixture of 140 ml. of cold concentrated aqueous ammonia and ice. After one-half an hour, the alkaline mixture is filtered and the solid dissolved in methanol and clarified with carbon. The methanol solution is then concentrated to about one-third its original volume and the solid collected and dried to yield 2'-hydroxy-2-methyl - 5-(p-chlorophenyl)-6,7-benzomorphan, M.P. 272–274° C.

Calc. for $C_{19}H_{20}ClNO$ (313.82): C, 72.73; H, 6.45; Cl, 11.30. Found: C, 72.40; H, 6.36; Cl, 11.40.

EXAMPLE 3

*2'-acetoxy-2-methyl-5-phenyl-6,7-benzomorphan*

A mixture of 1.68 g. of 2'-hydroxy-2-methyl-5-phenyl-6,7-benzomorphan, prepared as in Example 1, and 8.4 ml. of acetic anhydride is heated at 100° C. for 45 minutes. The solution is then poured into 20 ml. of cold water and after 5 minutes, an aqueous solution of 50% potassium hydroxide is added in slight excess with cooling. The liberated base is shaken quickly into ether. Drying and evaporation of the ethereal solution, followed by recrystallization from isopropyl ether affords 2'-acetoxy-2-methyl - 5-phenyl-6,7-benzomorphan, M.P. 120–122° C.

Calc. for $C_{21}H_{23}NO_2$ (321.40): C, 78.47; H, 7.21; N, 4.36. Found: C, 78.18; H, 7.25; N, 4.54.

The free base may be converted to the hydrochloride by dissolving in a minimum volume of absolute ethanol and treating the solution with ethanolic hydrogen chloride until acidic to Congo red indicator. The solution is then diluted with 5 volumes of anhydrous ether and allowed to crystallize. There is thus obtained 2'-acetoxy-2-methyl-5-phenyl-6,7-benzomorphan hydrochloride as the monohydrate, partial melt at 180–190° C. with a clear melt at 250–253° C.

In a similar fashion by employing acylating derivatives of other (lower) alkanoic acids the corresponding 2'-alkanoyloxy compounds can be obtained. For example, by use of propionyl chloride in the above procedure, there is obtained 2'-propionoyloxy-2-methyl - 5-phenyl-6,7-benzomorphan.

EXAMPLE 4

*2'-methoxy-2-methyl-5-phenyl-6,7-benzomorphan*

To a solution of 17.2 g. of phenyl trimethyl ammonium chloride in 25 ml. of absolute methanol at 25° C. is added a solution of 2.25 g. of sodium in 25 ml. of absolute methanol: The sodium chloride formed is removed by filtration in the absence of moisture and carbon dioxide. To this solution is added 25.0 g. of 2'-hydroxy-2-methyl-5-phenyl-6,7-benzomorphan in toluene. The mixture is then heated with stirring so as to permit removal of the solvents (100–110° C.). The reaction solution is then cooled, washed with cold, diluted aqueous sodium hydroxide solution and extracted with dilute aqueous hydrochloric acid. The acid extracts are rendered basic by the addition of aqueous ammonia. The solid which forms is dissolved in chloroform and the solution dried over sodium sulfate. Removal of the solvent then yields 2'-methoxy-2-methyl-5-phenyl-6,7-benzomorphan.

Alternatively, a solution of 24 g. of aluminum tribromide in 100 ml. of carbon disulfide is slowly added with cooling to a stirred suspension of 8.0 g. of the hydrochloride salt of 2-(4-methoxybenzyl)-1-methyl-4-phenyl-1,2,5,6-tetrahydropyridine in 50 ml. of carbon disulfide. When addition is complete, the cooling bath is removed and the mixture stirred and refluxed for half an hour. After cooling, the solvent is decanted and the viscous residue is added to a mixture of excess conc. aqueous ammonia, ice an chloroform. This mixture is stirred to decompose all of the aluminum tribromide complex and the chloroform layer is then separated and dried over sodium sulfate. After evaporating the solvent, the residue is triturated with ether, filtered and again evaporated to yield 2'-methoxy-2-methyl-5-phenyl-6,7-benzomorphan.

EXAMPLE 5

*2'-hydroxy-5-phenyl-6,7-benzomorphan*

(a) *2' - acetoxy-2-cyano-5-phenyl-6,7-benzomorphan.*—To a solution of 2.59 g. (24.4 mmole) of cyanogen bromide in 30 ml. of chloroform are added 6.53 g. (20.3 mmole) of 2 - acetoxy - 2-methyl-5-phenyl-6,7-benzomorphan as the free base. The addition is executed over a 45 minute period at room temperature. The reaction solution is refluxed for three hours and then concentrated in vacuo. The resulting solid is crystallized from acetone until the melting point is constant, M.P. 207–209° C.

(b) *2' - hydroxy- 5- phenyl-6,7-benzomorphan.*—To a suspension of 5.60 g. of lithium aluminum hydride in 100 ml. of dry tetrahydrofuran under anhydrous conditions are added 5.00 g. of 2'-acetoxy-2-cyano-5-phenyl-6,7-benzomorphan dissolved with the aid of heat in 100 ml. of dry tetrahydrofuran. The mixture is refluxed for 17 hours and then decomposed by the addition of 29 ml. of saturated sodium chloride solution. The resulting mixture is next refluxed an hour and filtered. The filtrate is concentrated in vacuo and the residue is then recrystallized from isopropanol to yield 2'-hydroxy-5-phenyl-6,7-benzomorphan, M.P. 239—241° C.

Calc. for $C_{18}H_{19}NO$ (265.34) C, 81.47; H, 7.22; N, 5.28. Found: C, 81.49; H, 7.23; N, 5.08.

EXAMPLE 6

*2'-hydroxy-5-(p-chlorophenyl)-6,7-benzomorphan*

(a) *2' - acetoxy-5-(p-chlorophenyl)-2-methyl-6,7-benzomorphan.*—A solution of 1.02 g. of 2'-hydroxy-5-(p-chlorophenyl)-2-methyl-6,7-benzomorphan in 7.00 ml. of acetic anhydride is heated for an hour at 100° C., poured into 30 ml. of cold water and rendered basic by the addition of 50% aqueous potassium hydroxide solution. The mixture is quickly extracted with ether, dried and concentrated. The residue is crystallized from isopropyl ether-petroleum ether (2:1) to yield 2'-actoxy-2-methyl-5-(p-chlorophenyl)-6,7-benzomorphan, M.P. 113–114° C. Further recrystallization raises the melting point to 115–117° C.

Calc. for $C_{21}H_{22}ClNO_2$ (355.85) C, 70.88; H, 6.23; Cl, 9.96. Found: C, 70.60; H, 6.10; Cl, 10.11, 9.91.

(b) *2' - hydroxy - 5-(p-chlorophenyl)-6,7-benzomorphan.*—To 0.453 g. of cyanogen bromide in 15 ml. of chloroform are slowly added over one hour 1.27 g. of 2' - acetoxy - 5 - (p - chlorophenyl)-2-methyl-6,7-benzomorphan in 30 ml. of chloroform. The solution is refluxed for three hours and concentrated in vacuo. The residue is then treated with 50 ml. of 2 N hydrochloric acid and refluxed for 20 hours. The mixture is next rendered basic by the addition of concentrated aqueous ammonia and the solid which forms collected to yield 2'-hydroxy - 5 - (p-chlorophenyl)-6,7-benzomorphan. After several recrystallizations from isopropanol (with clarification), the product demonstrates a melting point of 267–272° C.

Calc. for $C_{18}H_{18}ClNO$ (299.80) C, 72.11; H, 6.01; Cl, 11.83; N, 4.67. Found: C, 71.72; H, 6.12; Cl, 11.37; N, 4.72.

EXAMPLE 7

*2'-hydroxy-2-allyl-5-phenyl-6,7-benzomorphan*

Two grams of 2'-hydroxy-5-phenyl-6,7-benzomorphan, 1.12 g. of sodium bicarbonate and 1.12 g. of allyl bromide in 50 ml. of absolute ethanol are heated at reflux with stirring for eight hours. The solvent is then removed in vacuo and the residue taken up in water and chloroform. The aqueous layer is separated and the chloroform solution is extracted several times with dilute aqueous hydrochloric acid. The acidic extracts are clarified, filtered and rendered alkaline by the addition of aqueous ammonia. The solid which thus forms is taken up in chloroform and this chloroform solution dried over sodium sulfate and evaporated. The residue is recrystallized from methanol to give 2'-hydroxy-2-allyl-5-phenyl-6,7-benzomorphan.

EXAMPLE 8

*2'-hydroxy-2-propargyl-5-phenyl-6,7-benzomorphan*

A mixture of 10.0 g. of 2'-hydroxy-5-phenyl-6,7-benzomorphan, 5.5 g. of propargyl bromide, 5.5 g. of sodium bicarbonate and 150 ml. of N,N-dimethylformamide is heated at reflux with stirring for five dours. The solvent is then removed in vacuo and the residue is treated in the manner described in Example 7 to yield 2'-hydroxy-2-propargyl-5-phenyl-6,7-benzomorphan.

EXAMPLE 9

*2'-hydroxy-2-(3-methyl-2-butenyl)-5-phenyl-6,7-benzomorphan*

A mixture of 8.7 g. of 2'-hydroxy-5-phenyl-6,7-benzomorphan, 6.0 g. of 1-bromo-3-methyl-2-butene, 5.0 g. of sodium bicarbonate and 125 ml. of N,N-dimethylformamide is heated at reflux with stirring for four hours. The solvent is then removed in vacuo and the residue treated in the manner described in Example 7 to yield 2' - hydroxy - 2-(3-methyl-2-butenyl)-5-phenyl-6,7-benzomorphan.

EXAMPLE 10

*2'-hydroxy-2-(3-chloro-2-propenyl)-5-phenyl-6,7-benzomorphan*

A mixture of 8.7 g. of 2'-hydroxy-5-phenyl-6,7-benzomorphan, 4.4 g. of cis-1,3-dichloro-1-propene, 3.0 g. of sodium bicarbonate and 125 ml. of N,N-dimethylformamide is stirred at reflux for five hours. The solvent is then removed in vacuo and the residue is treated in the manner described in Example 7 to yield cis-2'-hydroxy-2-(3-chloro-2-propenyl)-5-phenyl-6,7-benzomorphan.

In a similar fashion, by using trans-1,3-dichloro-1-propene there is obtained trans-2'-hydroxy-2-(3-chloro-2-propenyl)-5-phenyl-6,7-benzomorphan.

EXAMPLE 11

*2'-hydroxy-2-(β-phenylethyl)-5-phenyl-6,7-benzomorphan*

To 1.20 g. of 2'-hydroxy-5-phenyl-6,7-benzomorphan 25 ml. dimethylformamide, 4.0 ml. water and 1.31 g. potassium carbonate at 100° C. (oil bath temperature) are added 1.41 ml. of phenylacetyl chloride over a 15 minute period. The reaction mixture is heated at 120–125° C. for three hours and then diluted with 50 ml. of water and extracted three times with 75 ml. portions of 2:1 n-butanol-benzene. The combined extracts are washed with dilute hydrochloric acid and then with water. The phenylacetamide derivative remaining after evaporation is treated with excess lithium aluminum hydride in tetrahydrofuran. After refluxing for 15 hours, the reaction mixture is cooled in ice and treated cautiously with saturated sodium chloride solution. The mixture is filtered and the filtrate evaporated. The solid thus formed is recrystallized from methanol to yield 2'-hydroxy-2-(β-phenylethyl)-5-phenyl-6,7-benzomorphan.

EXAMPLE 12

*2'-hydroxy-2-[β-(4-aminophenyl)ethyl]-5-phenyl-6,7-benzomorphan*

A mixture of 12 g. of 2'-hydroxy-5-phenyl-6,7-benzomorphan, 12 g. of 2-(4-nitrophenyl))-ethyl bromide and 8 g. of potassium carbonate in 180 ml. of dimethylformamide is stirred at 95–99° C. for eight hours. The cooled mixture is then poured into 1 l. of water and extracted into ethyl acetate. Evaporation of the extract yields 2'-hydroxy-2-[β-(4-nitrophenyl)-ethyl]-5-phenyl-6,7-benzomorphan.

A suspension of 4.5 g. of 2'-hydroxy-2-[β-(4-nitrophenyl)-ethyl]-5-phenyl-6,7-benzomorphan and 3 g. of 10% palladium-on-charcoal in 200 ml. of ethanol is hydrogenated in a Parr apparatus under a pressure of 40 lbs./in.$^2$. When the theoretical amount of hydrogen is absorbed, the catalyst is removed by filtration and the filtrate evaporated to dryness. The residue thus obtained, 2' - hydroxy - 2-[β-(4-aminophenyl)-ethyl]-5-phenyl-6,7-benzomorphan, is recrystallized from methanol.

EXAMPLE 13

*2'-hydroxy-2-cyclopropylmethyl-5-phenyl-6,7-benzomorphan*

By substituting 0.96 ml. of cyclopropyl carboxylic acid chloride for phenylacetyl chloride in the procedure of Example 11 and following the procedure therein described, there is obtained the compound 2'-hydroxy-2-cyclopropylmethyl-5-phenyl-6,7-benzomorphan.

In a similar fashion from equivalent amounts of n-valeryl chloride, β-methoxypropionyl chloride and β-chloropropionyl chloride, there are respectively obtained according to the procedure of Example 11 the compounds, 2' - hydroxy - 2-n-pentyl-5-phenyl-6,7-benzomorphan, 2'-hydroxy - 2 - (3 - methoxypropyl) - 5-phenyl-6,7-benzomorphan and 2' - hydroxy-2-(3-chloropropyl)-5-phenyl-6,7-benzomorphan.

EXAMPLE 14

*2'-hydroxy-2-(3-methylaminopropyl)-5-phenyl-6,7-benzomorphan*

Ten grams of 2'-hydroxy-2-(3-chloropropyl)-5-phenyl-6,7-benzomorphan in a large molar excess of liquid methylamine are heated in a pressure vessel at 80° C. for eight hours. At the end of this time, the mixture is cooled and the unreacted methylamine removed by evaporation. The residue is recrystallized from acetone to yield 2'-hydroxy-2-(3-methylaminopropyl)-5-phenyl-6,7-benzomorphan.

Treatment of an acetone solution of this product with anhydrous hydrogen chloride causes precipitation of the dihydrochloride salt.

By employing other amines such as ammonia, diethylamine and the like in the procedure of this example, the corresponding N-substituted 3-aminopropyl compounds are obtained.

EXAMPLE 15

*2'-acetoxy-5-phenyl-6,7-benzomorphan*

Eight grams of 2'-hydroxy-5-phenyl-6,7-benzomorphan hydrochloride and 50 ml. of acetic anhydride are heated at 100° C. for one hour. At the end of this time, the solution is cooled, rendered basic by the addition of dilute aqueous sodium hydroxide and filtered. The solid thus collected is dissolved in ether and this ethereal solution filtered and then dried over sodium sulfate. Evaporation of the solvent then yields the product, 2'-acetoxy-5-phenyl-6,7-benzomorphan.

EXAMPLE 16

*2'-acetoxy-2-(2-hydroxyethyl)-5-phenyl-6,7-benzomorphan*

Two grams of 2'-acetoxy-5-phenyl-6,7-benzomorphan are dissolved in sufficient absolute ethanol and the solution saturated with ethylene oxide. The saturated solution is permitted to stand for 15 hours at 25° C. and then evaporated in vacuo. The solid residue is recrystallized from acetone to yield 2'-acetoxy-2-(2-hydroxyethyl)-5-phenyl-6,7-benzomorphan.

By treatment of this product with acetic anhydride, there is obtained 2'-acetoxy-2-(2-acetoxyethyl)-5-phenyl-6,7-benzomorphan.

EXAMPLE 17

*2'-hydroxy-2-(2-hydroxyethyl)-5-phenyl-6,7-benzomorphan*

By adding about .05 g. of metallic sodium to a solution of 5.0 g. of 2'-acetoxy-2-(2-hydroxyethyl)-5-phenyl-6,7-benzomorphan in 50 ml. of absolute methanol, permitting the solution to stand for 15 hours, saturating the solution with carbon dioxide and evaporating the filtered reaction mixture, there is obtained the compound 2'-hydroxy-2-(2-hydroxyethyl)-5-phenyl-6,7-benzomorphan.

EXAMPLE 18

*2'-methoxy-2-methyl-5-(4-methoxyphenyl)-6,7-benzomorphan*

By substituting p-methoxyphenyl lithium for phenyl lithium in the procedure of Example 1(a) and sequentially executing the procedure of parts (b) and (c) of Example 1, there is obtained 1-methyl-2-(4-methoxybenzyl)-4-(4-methoxyphenyl)-1,2,5,6-tetrahydropyridine as the hydrochloride salt. A suspension of 4 g. of this compound in 25 ml. of carbon disulfide is stirred with cooling and to this suspension is slowly added 12 g. of aluminum tribromide in 50 ml. of carbon disulfide. Upon completion of the addition, the reaction mixture is stirred at reflux for 30 minutes and then permitted to cool. The solvent is decanted and the residue is added to an excess of aqueous ammonia in ice and chloroform with stirring. The chloroform layer is separated, dried over sodium sulfate and evaporated. The residue is triturated with ether and the resulting ethereal solution filtered and evaporated to yield the product 2'-methoxy-2-methyl-5-(4-methoxyphenyl)-6,7-benzomorphan.

EXAMPLE 19

*2'-hydroxy-2-methyl-5-(4-hydroxyphenyl)-6,7-benzomorphan*

Five grams of 2'-methoxy-2-methyl-5-(4-methoxyphenyl)-6,7-benzomorphan are heated under reflux for 30 minutes in the presence of 50 ml. of 48% hydrobromic acid. The mixture is cooled and poured into a mixture of 100 g. of ice and 60 ml. of concentrated aqueous ammonia. The precipitate is then extracted with chloroform. These extracts are dried over sodium sulfate and evaporated to yield 2'-hydroxy-2-methyl-5-(4-hydroxyphenyl)-6,7-benzomorphan.

Alternatively the product of this example is prepared by treating 1-methyl-2-(4-methoxybenzyl)-4-(4-methoxyphenyl)-1,2,5,6-tetrahydropyridine with hydrobromic acid according to the procedure of Example 1 (d).

EXAMPLE 20

*2'-hydroxy-5-(4-hydroxyphenyl)-6,7-benzomorphan*

By substituting 2'-hydroxy-2-methyl-5-(4-hydroxyphenyl)-6,7-benzomorphan for 2'-hydroxy-2-methyl-5-phenyl-6,7-benzomorphan in the procedure of Example 5, there is obtained the compound 2'-hydroxy-5-(4-hydroxyphenyl)-6,7-benzomorphan.

EXAMPLE 21

*2'-methoxy-2-methyl-5-(3,4-dimethoxyphenyl)-6,7-benzomorphan*

A solution of 76.5 g. (0.675 mole) of N-methyl-4-piperidone in 100 ml. of anhydrous ether is slowly added with stirring to a cooled solution of 183 g. (0.76 mole) of 3,4-dimethoxyphenyl magnesium bromide in 1 l. of anhydrous ether. Upon completion of the addition, the mixture is stirred for two hours at room temperature and then cooled in an ice bath. The unreacted Grignard reagent is decomposed by the careful addition of water after which is added 2.5 moles of hydrochloric acid diluted to 10% with water. The mixture is shaken and the aqueous layer then separated and rendered alkaline by the addition of aqueous ammonia. The aqueous mixture is extracted with chloroform and the chloroform extracts evaporated to a residue. This residue is dissolved in concentrated hydrochloric acid and the resulting solution then refluxed for two hours with stirring. The solution is cooled and poured into an ice cold aqueous excess of sodium hydroxide. This mixture is extracted with chloroform the the chloroform extracts then dried over sodium sulfate and evaporated. The residue is distilled in vacuo to yield the intermediate product 1-methyl-4 - (3,4-dimethoxyphenyl) - 1,2,5,6-tetrahydropyridine.

By substituting a molar equivalent amount of 1-methyl-4-(3,4-dimethoxyphenyl) - 1,2,5,6-tetrahydropyridine for 1-methyl-4-phenyl-1,2,5,6-tetrahydropyridine in the procedure of Example 1, parts (b) and (c) there is obtained the intermediate 1-methyl-2-(4-methoxybenzyl)-4-(3,4-dimethoxyphenyl) - 1,2,5,6-tetrahydropyridine. This compound as the hydrochloride salt is cyclized with aluminum tribromide according to the alternative procedure of Example 4, to yield 2'-methoxy-2-methyl-5-(3,4-dimethoxyphenyl)-6,7-benzomorphan.

This compound may be demethylated according to the procedure of Example 19 to yield 2'-hydroxy-2-methyl-5-(3,4-dihydroxyphenyl)-6,7-benzomorphan. Alternatively the trihydroxy compound may be prepared by treating 1-methyl-2-(4-methoxybenzyl) - 4 - (3,4-dimethoxyphenyl)-1,2,5,6-tetrahydropyridine with hydrobromic acid in a fashion analogous to that described in Example 1, part (d).

EXAMPLE 22

*2',3'-dimethoxy-2-methyl-5-phenyl-6,7-benzomorphan*

By substituting a molar equivalent amount of 3,4-dimethoxybenzyl chloride for p-methoxybenzyl chloride in the procedure of Example 1, part (b) and thereafter following the procedure of part (c) of the same example, there is obtained the intermediate, 1-methyl-2-(3,4-dimethoxybenzyl)-4-phenyl - 1,2,5,6 - tetrahydropyridine which may be cyclized according to the procedure of part (d) of Example 1 to yield 2',3'-dihydroxy-2-methyl-5-phenyl-6,7-benzomorphan and according to the alternative procedure of Example 4 to yield 2',3'-dimethoxy-2-methyl-5-phenyl-6,7-benzomorphan.

EXAMPLE 23

*2'-methoxy-2-methyl-5-(3-trifluoromethylphenyl)-6,7-benzomorphan*

By substituting a molar equivalent amount of m-trifluoromethylphenyl magnesium bromide for 3,4-dimethoxyphenyl magnesium bromide in the procedure of Example 21, there is obtained the intermediate 1-methyl-2-(4-methoxybenzyl) - 4 - (3-trifluorophenyl)-1,2,5,6-tetrahydropyridine which as the hydrochloride salt is cyclized according to the alternative procedure of Example 4 to yield 2'-methoxy-2-methyl-5 - (3-trifluoromethylphenyl)-6,7-benzomorphan and cyclized according to the procedure of part (d) of Example 1 to yield 2'-hydroxy-2-methyl-5-(3-trifluoromethylphenyl) - 6,7-benzomorphan. The 2'-hydroxy compound is converted to the corresponding 2'-methoxy compound according to the initial process of Example 4.

EXAMPLE 24

*2'-hydroxy-2-methyl-5-(4-methylphenyl)-6,7-benzomorphan*

By substituting p-tolyl lithium for phenyl lithium in the procedure of Example 1, part (a) and thereafter following the procedure of parts (b), (c) and (d), there is obtained the product 2'-hydroxy-2-methyl-5-(4-methylphenyl)-6,7-benzomorphan.

EXAMPLE 25

2'-hydroxy-2,9-dimethyl-5-phenyl-6,7-benzomorphan

By employing a molar equivalent amount of 1,3-dimethyl-4-phenyl-1,2,5,6-tetrahydropyridine in place of 1-methyl-4-phenyl-1,2,5,6-tetrahydropyridine in the procedure of Example 1, there is obtained 2'-hydroxy-2,9-dimethyl-5-phenyl-6,7-benzomorphan.

2'-hydroxy-2,9-dimethyl-5-phenyl-6,7-benzomorphan is also prepared by cyclizing the hydrochloride salt of 1,3-dimethyl-2-(4-methoxybenzyl)-4-phenyl-1,2,5,6-tetrahydropyridine with aluminum tribromide according to the alternative procedure of Example 4 to yield 2'-methoxy-2,9-dimethyl-5-phenyl-6,7-benzomorphan which is then in turn demethylated to the corresponding 2'-hydroxy compound by following the procedure of Example 19.

EXAMPLE 26

2-methyl-5-phenyl-6,7-benzomorphan

The product of this example is obtained by employing benzyl chloride in place of p-methoxybenzyl chloride in the procedure of Example 1, part (b) and thereafter following the procedures of parts (c) and (d).

EXAMPLE 27

2'-hydroxy-2-methyl-5-phenyl-6,7-benzomorphan maleate

A solution of 5.6 g. of 2'-hydroxy-2-methyl-5-phenyl-6,7-benzomorphan in hot methanol is treated with a solution of 2.4 g. of maleic acid in methanol. The resulting solution is concentrated and cooled to give the crystalline maleate salt of 2'-hydroxy-2-methyl-5-phenyl-6,7-benzomorphan.

Other salts such as the tartrate, succinate and the like are prepared in a similar manner by employing equivalent amounts of the appropriate acid in place of maleic acid.

EXAMPLE 28

Resolution of 2'-hydroxy-2-methyl-5-phenyl-6,7-benzomorphan

2'-Hydroxy-2-methyl-5-phenyl-6,7-benzomorphan (3.96 g.) and 4.4 g. of d-camphorsulfonic acid are suspended in boiling acetone and sufficient methanol is added to effect dissolution. The solution is then allowed to cool and the salt which forms is collected by filtration, dried and recrystallized from methanol-acetone (M.P. 241–247° C., $[\alpha]_D^{25} = +120°$, c.=0.5, methanol). The salt is then suspended in excess 10% aqueous ammonium hydroxide and the solid which forms collected and dried to yield the dextrorotatory base, M.P. 254–259° C., $[\alpha]_D^{25} = +173°$, c.=0.52, methanol.

The levorotatory base is recovered from the mother liquor of the original solution by concentration and purified via formation of the salt with d-tartaric acid.

What is claimed is:
1. A compound selected from the group consisting of (a) a benzomorphan of the formula:

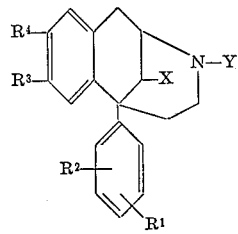

wherein each of $R^1$ and $R^2$ is independently selected from the group consisting of hydrogen, halogen, (lower)alkyl, (lower)alkoxy, (lower)alkanoyloxy, hydroxy and trifluoromethyl;

each of $R^3$ and $R^4$ is independently selected from the group consisting of hydrogen, hydroxy, (lower)alkoxy and (lower)alkanoyloxy;

X is a member selected from the group consisting of hydrogen and (lower)alkyl; and Y is a member selected from the group consisting of hydrogen, (lower)alkenyl, halo(lower)alkenyl, (lower)alkynyl and Z-alkylene wherein Z is a member selected from the group consisting of hydrogen, cycloalkyl, phenyl, halophenyl, nitrophenyl, aminophenyl, (lower)alkoxyphenyl, amino, alkylamino, dialkylamino, hydroxy, (lower)alkoxy and (lower)alkanoyloxy; and (b) the salts thereof with pharmaceutically acceptable nontoxic acids.

2. A compound of the formula:

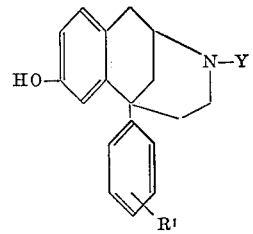

wherein $R^1$ is selected from the group consisting of hydrogen, halogen, (lower)alkyl, (lower)alkoxy, (lower)alkanoyloxy, hydroxy and trifluoromethyl and Y is a member selected from the group consisting of hydrogen, (lower)alkenyl, halo(lower)alkenyl, (lower)alkynyl and Z-alkylene wherein Z is a member selected from the group consisting of hydrogen, cycloalkyl, phenyl, halophenyl, nitrophenyl, aminophenyl, (lower)alkoxyphenyl, amino, hydroxy, (lower)alkoxy and (lower)alkanoyloxy, alkylamino, and dialkylamino.

3. A compound as defined in claim 1 wherein the compound is 2'-hydroxy-2-methyl-5-phenyl-6,7-benzomorphan.

4. A compound as defined in claim 1 wherein the compound is 2'-hydroxy-2-methyl-5-(p-chlorophenyl)-6,7-benzomorphan.

5. A compound as defined in claim 1 wherein the compound is 2'-methoxy-2-methyl-5-phenyl-6,7-benzomorphan.

6. A compound as defined in claim 1 wherein the compound is 2'-hydroxy-5-phenyl-6,7-benzomorphan.

7. A compound as defined in claim 1 wherein the compound is 2'-hydroxy-5-(p-chlorophenyl)-6,7-benzomorphan.

8. A compound as defined in claim 1 wherein the compound is 2'-hydroxy-2-allyl-5-phenyl-6,7-benzomorphan.

9. A compound as defined in claim 1 wherein the compound is 2'-hydroxy-2-propargyl-5-phenyl-6,7-benzomorphan.

10. A compound as defined in claim 1 wherein the compound is 2'-hydroxy-2-(3-methyl-2-butenyl)-5-phenyl-6,7-benzomorphan.

11. A compound as defined in claim 1 wherein the compound is 2'-hydroxy-2-(3-chloro-2-propenyl)-5-phenyl-6,7-benzomorphan.

12. A compound as defined in claim 1 wherein the compound is 2'-hydroxy-2-(β-phenylethyl)-5-phenyl-6,7-benzomorphan.

13. A compound as defined in claim 1 wherein the compound is 2'-hydroxy-2-[β-(4-aminophenyl)ethyl]-5-phenyl-6,7-benzomorphan.

14. A compound as defined in claim 1 wherein the compound is 2'-hydroxy-2-cyclopropylmethyl-5-phenyl-6,7-benzomorphan.

15. A compound as defined in claim 1 wherein the compound is 2'-hydroxy-2-(2-hydroxyethyl)-5-phenyl-6,7-benzomorphan.

16. A compound as defined in claim 1 wherein the compound is 2'-hydroxy-2-(3-methylaminopropyl)-5-phenyl-6,7-benzomorphan.

17. A compound as defined in claim 1 wherein the compound is 2'-hydroxy-2-(3-chloropropyl)-5-phenyl-6,7-benzomorphan.

18. A compound as defined in claim 1 wherein the compound is 2'-hydroxy-2-(3-methoxypropyl)-5-phenyl-6,7-benzomorphan.

19. A compound as defined in claim 1 wherein the compound is 2'-hydroxy-2,9-dimethyl-5-phenyl-6,7-benzomorphan.

No references cited.

WALTER A. MODANCE, *Primary Examiner.*
AVROM D. SPEVACK, *Assistant Examiner.*